Feb. 14, 1939. R. C. LEGAT 2,146,964
METHOD OF MAKING GUIDE HOLDERS
Filed June 27, 1936
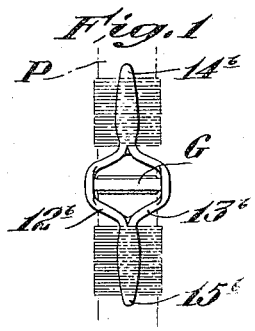
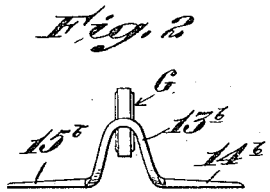
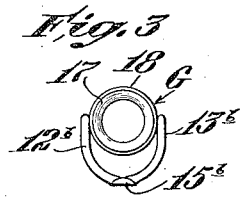
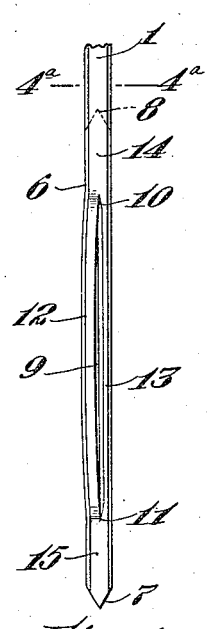
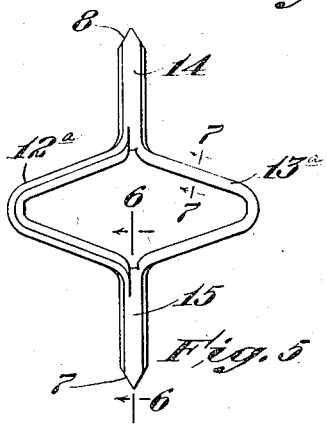
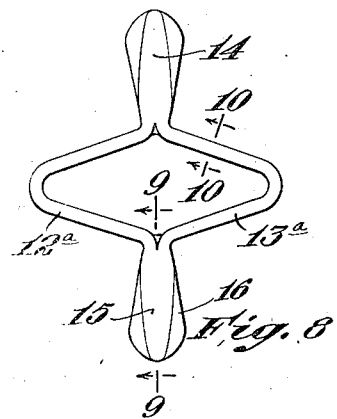
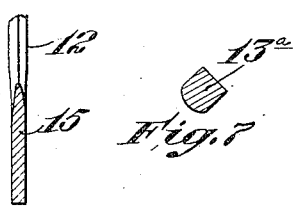
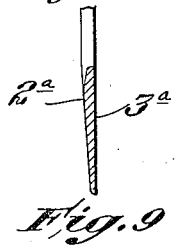
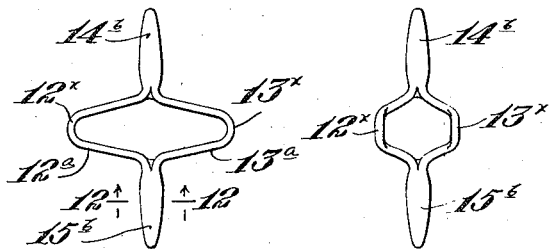
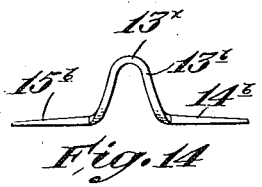
Inventor
Robert C. Legat
by Roberts Cushman & Woodberry
Att'ys.

Patented Feb. 14, 1939

2,146,964

UNITED STATES PATENT OFFICE 2,146,964

METHOD OF MAKING GUIDE HOLDERS

Robert C. Legat, New Britain, Conn., assignor to G. E. Prentice Manufacturing Company, New Britain, Conn., a corporation of Connecticut Application June 27, 1936, Serial No. 87,609

7 Claims. (Cl. 29—148)

This invention pertains to line guides for fishing poles and relates more particularly to a method of making an improved guide holder therefor. Line guides of the better type customarily comprise an eye or annulus of some smooth wear-resistant material, for example, glass, porcelain or the like, embraced by a metallic collar or ring, and this collar or ring is disposed between and firmly secured, as by soldering, to a pair of spaced, upstanding arms which engage the ring at diametrically opposite points,—the arms forming parts of the holder which usually comprises a pair of aligned prongs or fingers designed to be lashed or whipped to a fishing pole by wrappings of silk thread, fine wire or the like.

In accordance with one prior procedure, the holder in which the ring is mounted is made from a length of round wire. This wire is first bent to form substantially parallel runs, each with a substantially V-shaped bight intermediate its ends, the parts all being disposed in substantially the same plane, and then the parallel runs are soldered or brazed together. After the parts are thus united, the partially formed holder is subjected to a pressing or stamping operation so as to flatten the united portions of the wire and to shape them so that they constitute the desired attaching prongs or fingers for securing the holder to the fishing pole. The oppositely directed bights are then bent upwardly from out of their original plane to form the ring-supporting arms, between which the ring is subsequently soldered.

Since the rings are of fixed predetermined external diameter and only contact the arms of the holder at diametrically opposite points, it is essential that the holder arms be accurately shaped, spaced, and dimensioned so that the ring may be firmly united to the holder and remain accurately positioned with its axis parallel to the axis of the fishing pole. However, the mode of procedure above outlined, which includes bending a length of round wire to form a substantially plane figure, subsequently soldering its parts, and then bending portions out of their original plane, almost necessarily results in twisting the wire to some extent and thus, after the arms have been bent as above described, for example by the operation of a wire bending machine, it becomes necessary to subject the holder to a sizing operation whereby the parts are made to conform accurately to the desired size and shape. This sizing operation is slow and troublesome and adds substantially to the cost of production. Moreover, the soldering or brazing operation anneals and softens the wire, and as the line guide holder is subjected to extremely hard usage, it frequently happens that the holder is bent so as to throw the guide eye out of alignment.

Objects of the present invention are to provide an improved method of procedure whereby a guide holder may be made with less trouble and expense than by previous methods, in particular by elimination of the customary sizing operation, and at the same time to produce a holder of improved durability and appearance.

Other objects and advantages of the invention will be made apparent in the following more detailed description and by reference to the accompanying drawing, wherein Fig. 1 is a front elevation of a complete holder with its associated guide as it appears when attached to a fishing pole (indicated in broken lines), the pole being vertically disposed;

Fig. 2 is a side elevation of the complete holder and guide of Fig. 1;

Fig. 3 is an end elevation of the device shown in Fig. 1;

Fig. 4 is a fragmentary plan view illustrating the end portion of a length of flat wire or metallic ribbon from which the improved holder may be made and illustrative of some of the earlier steps of the improved method hereinafter described;

Fig. 4a is a section, to enlarged scale, on the line 4a—4a of Fig. 4;

Fig. 5 is a plan view showing the result of the spreading operation;

Fig. 6 is a fragmentary section on the line 6—6 of Fig. 5;

Fig. 7 is a section on the line 7—7 of Fig. 5;

Fig. 8 is a plan view showing the partially formed holder as it appears at the completion of the stamping operation;

Fig. 9 is a fragmentary section on the line 9—9 of Fig. 8;

Fig. 10 is a section on the line 10—10 of Fig. 8;

Fig. 11 is a plan view of the partially completed holder as it appears after it has been trimmed;

Fig. 12 is a section, to larger scale, on the line 12—12 of Fig. 11;

Fig. 13 is a plan view of the holder in its substantially completed form but before the guide ring has been associated with it; and Fig. 14 is a side elevation of the holder shown in Fig. 13.

Referring to the drawing, the numeral 1 designates a strip of metallic ribbon or flat wire, preferably of approximately rectangular cross section, as illustrated in Fig. 4a, having the upper and lower flat and parallel surfaces 2 and 3 and the edges 4 and 5. This wire or ribbon may be formed by slitting or splitting sheet material or by a drawing operation, preferably the latter, so that the fiber runs predominantly in a longitudinal direction, and may be provided in lengths of indefinite extent, for example, in the form of a coil suitable to be delivered to a machine for performing the subsequent operations, or at least a part of them.

In accordance with the present method, the first step in the process may consist in cutting off from this length of material 1 a piece of appropriate length to form a single guide holder. Preferably this piece is cut from the wire by means of a cutter which forms beveled ends 7 and 8, as illustrated in Figs. 4 and 5, although this is not essential. The piece thus cut off is of somewhat greater length than the desired holder since, in the subsequent steps, it is contracted longitudinally. The next step to be performed is that of slitting the piece of material longitudinally by an incision, as indicated at 9. This incision is substantially midway between the edges 4 and 5 of the ribbon, so that the material at 12 and 13 at each side of the slit is approximately of the same width. This slitting operation may be performed after the piece of material has been severed from the ribbon 1 or, if desired, the slit may first be formed and then the piece cut off, or both cutting and slitting operations may be performed simultaneously, as desired. As shown in Fig. 4, the slit 9 terminates at the points 10 and 11 which are at substantially equal distances respectively from the ends 7 and 8 of the piece of material,—the intervening end portions 14 and 15, between the points 8 and 10, and 7 and 11 respectively, each approximating the length of one of the desired anchoring prongs of the holder which is to be made, and being unslitted.

The next step is to spread the parts 12 and 13 away from each other, as illustrated in Fig. 5, in effect producing two oppositely directed, more or less V-shaped bights each having legs whose ends are integrally united to the unslitted end portions 14 and 15, respectively. The slitting and spreading operations tend to harden the material forming these bights, but leave this material with sharp edges, as indicated in Fig. 7. It is also to be noted that the members 14 and 15 at this stage of the process are of substantially the same thickness and transverse shape as that of the original wire.

The partially formed holder is now subjected to a stamping or pressing operation, for example between suitable dies, which preferably reduces each of the bights 12a and 13a to an approximately circular cross section, as shown in Fig. 10, and at the same time tapers the end portions 14 and 15. Preferably these end portions are so shaped in this stamping or pressing operation that each one has a substantially flat rear face 3a (Fig. 9) but tapers in thickness from its point of junction with the legs of the bights 12a and 13a toward its free extremity and also tapers transversely, as indicated in Figs. 9 and 12, respectively. This stamping or pressing operation, whereby the metal is caused to flow while the metal is cold, very materially hardens and stiffens the metal, it being well recognized that cold working has this effect. The stamping operation also results in the formation of fins or burrs 16, and the next step in the operation is to trim off these burrs, for example by grinding or cutting, the result being to reduce the partially formed holder to the shape illustrated in Fig. 11.

The next step in the operation consists in bending up the bights 12a and 13a so that their narrower mid-portions 12x and 13x are disposed substantially in parallel planes which are substantially perpendicular to the plane of the surface 3a, said portions 12x and 13x being spaced apart a distance accurately equal to the external diameter of the guide ring which is to be inserted between them.

By proceeding as above described, the fiber of the metal in the parts 12a and 13a runs in the same direction,—the parts 12a and 13a are of substantially identical dimensions, and thus when subjected to the bending operation offer substantially equal resistance and thus finally assume positions accurately symmetrical with respect to the longitudinal axis of the holder. Thus no subsequent sizing operation is necessary.

The holder is now ready for the application of the guide ring, although it is ordinarily preferred to subject it to a tumbling operation whereby the surfaces are smoothly finished and polished, it being noted that by reason of the cold working of all of the parts of the holder during the slitting, spreading, stamping and bending operations, the metal becomes so hard that it takes a very high and permanent polish. Moreover, this cold working so stiffens the material that the holder resists deformation by imposed stresses and thus, during use, retains the line guide in accurately aligned position.

As illustrated in Figs. 1, 2 and 3, the guide ring G comprises the inner annulus 17 which may be of porcelain, glass or the like, and which is embraced by an outer ring 18 of metal which is disposed between the arms 12b and 13b of the holder and which is secured to said arms by brazing or soldering so that the axis of the ring is substantially parallel to the length of the aligned prongs 14b and 15b. This holder is mounted on the pole P, as illustrated in Fig. 1, and is secured to the pole by wrappings or lashings of silk thread, fine wire, or the like, all as is customary in the art.

While one desirable procedure has been described in detail for producing the improved holder, it is to be understood that the invention is capable of modification as by the substitution of equivalent steps or by the omission or addition of steps in accordance with circumstances, and that while metal has been referred to as the material for use in making the holder, other materials suitable for the purpose may be substituted and, furthermore, that the invention is not necessarily restricted to the formation of a holder of the exact shape and contour here shown or to one having attaching prongs such as those here described, but that the invention is to be regarded as inclusive of all equivalents within the scope of the appended claims.

I claim:

1. That method of making line guide holders which comprises as steps splitting a length of flat wire by a longitudinal incision disposed substantially midway between its edges and which terminates at a predetermined distance from each end of the length of material thereby to leave unsplit end portions of the wire, spreading apart the material at opposite sides of the incision thereby to form substantially V-shaped oppositely directed bights having rounded bases and whose legs are integrally joined to said end portions of the original wire, tapering said end portions toward their outer extremities, and bending the bights to cause their narrow midportions to stand in substantially parallel planes spaced apart to receive a line guide between them, said splitting, spreading apart, tapering and bending steps being performed while the wire is cold, thereby very materially hardening and stiffening the wire.

2. That method of making line guide holders which comprises as steps splitting a length of flat wire by a longitudinal incision disposed substantially midway between its edges and which terminates at a predetermined distance from each end of the length of material thereby to leave unsplit end portions of the wire, spreading apart the material at opposite sides of the incision thereby to form substantially V-shaped oppositely directed bights having rounded bases and whose legs are integrally joined to said end portions of the original wire, reducing the material of the bights substantially to a circular cross section, and stamping the end portions of wire to form attaching prongs which are substantially flat on one face and which taper in thickness toward their outer extremities, said splitting, spreading apart, reducing and stamping steps being performed while the wire is cold, thereby very materially hardening and stiffening the wire.

3. That method of making line guide holders which comprises as steps splitting a length of flat wire by a longitudinal incision disposed substantially midway between its edges and which terminates at a predetermined distance from each end of the length of material thereby to leave unsplit end portions of the wire, spreading apart the material at opposite sides of the incision thereby to form substantially V-shaped oppositely directed bights having rounded bases whose legs are integrally joined to said end portions of the original wire, stamping the end portions of the wire to form attaching prongs which are substantially flat at one face and which taper both in width and thickness toward their outer extremities, and trimming off the burrs resulting from the stamping operation, said splitting, spreading apart and stamping steps being performed while the wire is cold, thereby very materially hardening and stiffening the wire.

4. That method of making line guide holders which comprises as steps splitting a length of flat wire by a longitudinal incision disposed substantially midway between its edges and which terminates at a predetermined distance from each end of the length of material thereby to leave unsplit end portions of the wire, spreading apart the material at opposite sides of the incision thereby to form substantially V-shaped oppositely directed bights having rounded bases whose legs are integrally joined to said end portions of the original wire, stamping the material forming the bights to reduce it approximately to a circular cross section, removing burrs resulting from the stamping operation, and bending the material forming the bights to cause the narrow mid-portions of the bights to lie in substantially parallel planes perpendicular to the plane of the original wire, said splitting, spreading apart, stamping and bending steps being performed while the wire is cold, thereby very materially hardening and stiffening the wire.

5. That method of making line guide holders which comprises as steps providing a length of metallic ribbon of approximately rectangular cross section and in which the fiber extends predominantly in a longitudinal direction, splitting the ribbon by a longitudinal incision disposed substantially midway between its longitudinal edges and which terminates at a predetermined distance from each end of the length of ribbon thereby to leave unsplit end portions of the ribbon each of predetermined length, spreading apart the material at opposite sides of the incision thereby to form bights each having a rounded base and one of its legs integrally joined to one of said unsplit end portions of the ribbon, respectively, the material of the bights being hardened by the splitting and spreading operation, pressing said bights to an approximately circular cross section, thereby further hardening the material thereof, and bending the material at the bights to cause the bights to curve forwardly with their midportions disposed substantially parallel and in planes which are substantially perpendicular to the plane of the original ribbon.

6. That method of making line guide holders which comprises as steps providing a length of metallic ribbon of approximately rectangular cross section and in which the fiber extends predominantly in a longitudinal direction, splitting the ribbon by a longitudinal incision disposed substantially midway between its longitudinal edges and which terminates at a predetermined distance from each end of the length of ribbon thereby to leave unsplit end portions of the ribbon each of predetermined length, spreading apart the material at opposite sides of the incision thereby to form bights each having one of its legs integrally joined to one of said unsplit end portions of the ribbon, respectively, the material of the bights being hardened by the splitting and spreading operation, stamping said unsplit end portions to taper them in width and thickness outwardly from their junctions with the arms of the bights, removing burrs resulting from the stamping operation, curving the bights forwardly to bring their mid-portions into substantially parallel relation and spaced apart a distance substantially equal to the external diameter of the line guide which is to be held between them, and subjecting the holder to a tumbling operation.

7. That method of making guide holders which comprises as steps splitting a length of flat wire by a longitudinal incision disposed substantially midway between its edges and which terminates at a predetermined distance from each end of the length of material thereby to leave unsplit end portions of the material, spreading apart the material at opposite sides of the incision in such a way as to form substantially V-shaped oppositely directed bights having rounded bases and integrally joined to each end portion of the original wire, tapering said end portions toward their outer extremities, and bending the bights to bring their mid-portions into substantially parallel relation and spaced to receive a line guide between them, said splitting, spreading apart, tapering and bending steps being performed while the wire is cold, thereby very materially hardening and stiffening the wire.

ROBERT C. LEGAT.